Patented Sept. 7, 1948

2,448,556

UNITED STATES PATENT OFFICE 2,448,556

SYNTHETIC ELASTIC AND ELASTOMERIC PRODUCTS

Murray M. Sprung, Scotia, and Charles A. Burkhard, Alplaus, N. Y., assignors to General Electric Company, a corporation of New York No Drawing. Application January 16, 1947, Serial No. 722,459

13 Claims. (Cl. 260—46.5)

This invention is concerned with novel synthetic elastic and elastomeric products and methods of preparing the same. More particularly, this invention relates to synthetic elastic products containing as an elastic element thereof an elastic polymer of a methyl- and hydrogen-substituted polysiloxane wherein the methyl radical and the hydrogen are present in the form of recurring structural units corresponding to the formulas (CH$_3$)$_2$SiO and CH$_3$HSiO.

In Agens application Serial No. 526,473, filed March 14, 1944, and assigned to the same assignee as the present invention, there is disclosed and claimed synthetic compositions comprising an elastic polymer of a dimethyl silicone in which substantially all the silicon atoms are each connected to two methyl groups, i. e., the condensation products of the claimed invention contain an average of approximately two methyl groups per silicon atom. These polymeric materials, which exhibit all the physical characteristics of known natural and synthetic rubbers or elastic gums, for instance, elasticity, compressibility, good tensile strength, etc., possess, in addition to the foregoing properties, additional properties unobtainable with prior rubbers or elastomers prepared synthetically or derived from natural sources.

For example, the products disclosed and claimed in the aforementioned Agens application can be elongated and stretched in the same manner as known elastic or elastomeric products, and, in addition, are characterized by their flexibility at low temperatures (—60° C.) and particularly by their heat-resistance. They have been found to retain their desirable rubber-like properties when heated for long periods of time at elevated temperatures of from 150° to 200° C. These elastic polymeric silicones or elastic gums may be compounded with various fillers and catalysts, and vulcanized under the influence of heat and pressure to yield synthetic elastomers or elastomeric products having improved extensibility and tensile strength over that possessed by the unfilled, unvulcanized elastic product.

Moreover, under the influence of heat and pressure, and in the presence of certain catalysts or vulcanization accelerators, the filled (or unfilled) elastic product may be converted to the infusible and insoluble state. More specific directions for the preparation of these synthetic elastic products and the synthetic elastomerics compositions therefrom, i. e., the vulcanized products, as well as the properties and structural constitution of these polymeric organo-siloxanes, may be found in the previously mentioned Agens application and in the applications of Marsden and Roedel, Serial No. 598,913, filed June 11, 1945, and Serial No. 549,128, filed August 11, 1944, now Patent No. 2,346,220, in Marsden application Serial No. 676,105, filed June 11, 1946, and in Sprung application Serial No. 676,091, filed June 11, 1946, all the foregoing applications having been assigned to the same assignee as the instant application.

One of the difficulties encountered in the manufacture of synthetic elastomers i. e., the heat-converted or vulcanized products obtained from the elastic gums, has been the excessive lengths of time required to heat-treat the molded product prepared therefrom in order to effect complete cure or conversion of the molded object to the infusible or insoluble state. For example, in the preparation of dimethyl silicone elastomers from elastic compositions obtained as a result of effecting conversion to the elastic gum stage of the hydrolysis product of dimethyl dichlorosilane (see the aforementioned Agens application), it is often necessary to heat the molded product for from about 10 to 25 hours at elevated temperatures of the order of approximately 200° C. to completely cure the molded product. This extensive heating cycle is necessary due to the extremely slow curing properties of the elastic composition, notwithstanding the incorporation of cure accelerators.

We have now discovered that heat-curable synthetic elastic products containing as an elastic element thereof an elastic, polymeric organo-siloxane comprised substantially of the recurring structural units corresponding to the formulas (CH$_3$)$_2$SiO and CH$_3$HSiO (or stated alternatively, the recurring structural units may be shown as

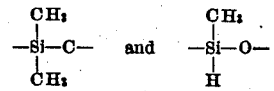

which units, with regards to their occurrence, may be present in a regular or random distribution) can be cured or rendered infusible and insoluble in much shorter periods of time than has hereto been possible where substantially all the repetitive units in the polymeric organo-siloxane have the structural formula (CH$_3$)$_2$SiO. The manner in which this is accomplished is not exactly understood. However, it is believed that cross-linking of the chain structures is effected by removal of the hydrogens on the silicon atoms thereby establishing bridges or linkages between silicon atoms of parallel polysiloxane chains during the vulcanization process, which bridges may connect silicons of neighboring chains directly or through the intermediation of oxygen atoms.

In addition to the faster cure described above, other advantages accruing from the practice of our invention are more rapid conversion of the liquid oily hydrolysis product at room temperature to the elastic gum stage with ordinary elasticizing agents, curability of the elastic products at lower temperatures, curability at higher temperatures within shorter periods of time, relatively high tensile strengths of the elastomeric compositions prepared from these elastic polymeric materials, especially in the absence of certain reinforcing fillers, increased hardness, etc.

The synthetic elastic products with which our invention is concerned, and which may be employed in the preparation of the synthetic elastomers, may be prepared in several ways. One method comprises hydrolyzing a mixture comprising (1) a pure or substantially pure dimethyl dihalogenosilane, for example, dimethyl dichlorosilane, or an equivalent methyl-substituted silane, for instance, dimethyl diethoxy silane, or a silane containing two methyl groups and two hydrolyzable groups connected to the silicon atom, and (2) a silane containing a methyl group and a hydrogen connected to the silicon atom, the two other valences of the silicon atom being satisfied by two hydrolyzable groups, e. g., chlorines.

A more complete description of the nature of the methyl- and hydrogen-substituted polysiloxanes used in practicing the present invention may best be obtained by reference to their preparation. In the preparation of methyl halogenosilanes (methyl silicon halides) according to the direct synthesis of that disclosed and claimed in Rochow Patent 2,380,995, issued August 3, 1945, and assigned to the same assignee as the present invention, for example, there is obtained a mixture of methyl halogenosilanes of the formula $(CH_3)_a SiX_{4-a}$ wherein X is a halogen atom and $a$ is a number equal to 1, 2, or 3. By fractional distillation, the different compounds may be isolated in a substantially pure state, the degree of purity depending on the nature of substituent X as well as on the efficiency of the distillation apparatus. For example, in the fractional distillation of a methyl chlorosilane mixture, dimethyl dichlorosilane is obtained at a temperature of about 70° C. at 760 millimeters. As is the case in most distillation processes, the dimethyl dichlorosilane is not absolutely pure but ordinarily contains some methyl trichlorosilane which boils at about 66° C. For the purposes of the present invention, we can use a dimethyl dichlorosilane fraction containing less than 2 mol per cent of methyl trichlorosilane, the optimum upper range of the methyl trichlorosilane being less than 0.5 mol per cent.

The other halogenosilane, for example, methyl dichlorosilane $(CH_3SiHCl_2)$, which is employed in the preparation of our claimed elastic gums or compositions, is also obtained along with the aforementioned methyl halogenosilanes. However, since the methyl dichlorosilane boils at a much lower temperature than the other methyl chlorosilane mentioned previously (about 41° C.), no difficulty is encountered in removing the methyl dichlorosilane from the other methyl chlorosilanes.

In the preparation of the elastic polymers of the claimed methyl- and hydrogen-substituted polysiloxanes, the dimethyl dichlorosilane is preferably cohydrolyzed with the methyl dichlorosilane. However, it is within the scope of this invention to hydrolyze the individual constituents separately, and mix the resulting liquid oily hydrolysis products together. Thereafter, the hydrolysis product (whichever one is employed) is contacted with a minor proportion, preferably from approximately 0.5 to 5 per cent, by weight (based on the weight of the cohydrolysis product), of a condensation catalyst or elasticizing agent capable of converting the liquid oily hydrolysis product (or mixture of hydrolysis products) to the elastic gum stage. Among the elasticizing agents which may be employed for this purpose are ferric chloride, alkali-metal hydroxides, for example, sodium hydroxide, potassium hydroxide, etc.; sulfuric acid, phenyl phosphoryl chloride $(C_6H_5OPOCl_2)$, dimethyl dichlorosilane, etc. We prefer to use phenyl phosphoryl chloride as the elasticizing agent, the use of such agent being more specifically disclosed and claimed in the aforementioned Sprung application (supra).

The transformation of the liquid oily hydrolysis products which contain an average of from about 1.98 to 2.0 total methyl radicals and hydrogen atoms per silicon atom to elastic gums (and thereafter to heat-converted synthetic elastomers) is believed to be due to a rearrangement of the repetitive units $[(CH_3)_2SiO$ and $CH_3HSiO]$ of the siloxane polymers into polymers of extremely high molecular weight which may best be described as elastic gums or solids having springy or elastic recovery characteristics and being capable of recovering size and shape after deformation. This transformation may be accomplished in a number of ways, for instance, by the use of the elasticizing agents previously mentioned. The conversion of the liquid hydrolysis products to the elastic gum stage by the elasticizing agents may be effected under the influence of heat, for example, from above room temperature (25° C.) to about 125° C. However, we prefer to incorporate the elasticizing agent in the liquid hydrolysis product and allow the mixture to stand at room temperatures for the varying lengths of time required to yield the above-described elastic gums or compositions.

In order to prepare synthetic elastomeric compositions from the elastic gum, the latter is worked on ordinary mixing or differential rolls used in milling rubber until it attains the desired consistency for molding or extruding. Curing catalysts or vulcanizing agents and fillers may be added during this operation. After being formed into the desired shape in molds under the influence of heat and pressure, the synthetic elastomers may be further cured or vulcanized by heat-treating in an oven until the desired degree of cure is obtained.

In the case where, for example, dimethyl dichlorosilane and methyl dichlorosilane are cohydrolyzed together in the same hydrolysis medium, it is desirable, although not essential, that the molar proportions of the former to the latter be maintained within certain ranges. Thus, we have found that there is less difficulty in molding the elastic gum if the mixture of dimethyl dichlorosilane and methyl dichlorosilane contains at least 50 mol per cent of the former, preferably 70 mol per cent. Good results are obtained if, in the cohydrolysis step, the molar proportions of the aforementioned chlorosilanes comprise, by weight, from about 3 to 30 mol per cent methyl dichlorosilane and from approximately 97 to 70 mol per cent dimethyl dichlorosilane. If the amount of methyl dichlorosilane is substantially in excess of 50 mol per cent, the elastomeric compositions obtained therefrom cure to the infusible and insoluble state at such a rate that it is sometimes difficult to control the molding of products therefrom. In addition, the heat-converted or vulcanized compositions obtained from elastic gums prepared from hydrolysis products containing more than 50 mol per cent of the structural unit $CH_3HSiO$ tend to be harder with lower tensile strengths.

In order that those skilled in the art may better understand how our claimed synthetic compositions may best be prepared, the following examples are given by way of illustration and not by way of limitation. All parts are by weight.

EXAMPLE 1

A mixture of chlorosilanes comprising, by weight, about 12.5 mol per cent methyl dichlorosilane and 87.5 mol per cent dimethyl dichlorosilane was hydrolyzed in water. The liquid oily hydrolysis product was removed and approximately 0.5 per cent by weight (based on the weight of the oily hydrolysis product) of phenyl phosphoryl chloride was added. The mixture was allowed to stand at about 27° C. for approximately 48 hours. After this time there was obtained a soft, non-tacky, compressible, elastic composition. About 100 parts of the above elastic gum was milled with approximately 200 parts titanium dioxide and 2.5 parts benzoyl peroxide. Several samples were molded from the filled material by pressing them for about 10 minutes at 150° C. under a pressure of about 1000 p. s. i. Thereafter, the samples were cured for varying the lengths of time at different temperatures to determine the effect on tensile strength, elasticity, and hardness of the respective samples. The following table shows the results of curing the samples under the aforementioned varying conditions.

Table 1

| Cure Time, Hours | Temp., °C. | Tensile Strength, p. s. i. | Per Cent Elongation | Shore Hardness |
|---|---|---|---|---|
| 1 | 150 | 240 | 150 | 47 |
| 3 | 150 | 320 | 100 | 54 |
| 6 | 150 | 350 | 100 | 62 |
| 1 | 200 | 420 | 100 | 63 |
| 2 | 200 | 425 | 100 | 70 |
| 4 | 200 | 435 | 75 | 76 |

EXAMPLE 2

In this example, samples of synthetic elastomeric compositions were prepared in the same manner as was done in Example 1 with the exception that the mixture of chlorosilanes employed at the beginning comprised, by weight, about 25 mol per cent methyl dichlorosilane and 75 mol per cent dimethyl dichlorosilane. The elasticizing process, i. e., the conversion of the liquid oily hydrolysis product to the elastic gum stage, and the compounding of the elastic gum with the same proportion of titanium dioxide and benzoyl peroxide were substantially the same as that employed in Example 1. Table 2 shows the results of heat-treating the samples for various periods of time at different temperatures.

Table 2

| Cure Time, Hours | Temp., °C. | Tensile Strength, p. s. i. | Per Cent Elongation | Shore Hardness |
|---|---|---|---|---|
| 2 | 100 | 340 | 100 | 52 |
| 4 | 100 | 370 | 100 | 55 |
| 1 | 150 | 380 | 100 | 58 |
| 3 | 150 | 400 | 100 | 63 |
| 6 | 150 | 440 | 100 | 67 |
| 1 | 200 | 570 | 75 | 70 |

EXAMPLE 3

The following results show the effect on the synthetic elastomeric compositions of using varying molar proportions of methyl dichlorosilane (in the preparation of the elastic gum) in combination with the same filler, namely, titanium dioxide, with and without the presence of cure accelerators or vulcanizing agents, e. g., lead oxide or benzoyl peroxide. The mixture of dimethyl dichlorosilane and methyl dichlorosilane were cohydrolyzed and converted to the elastic gum stage in the same manner as was done in Example 1. In each case, about 200 parts titanium dioxide were milled with 100 parts of the particular elastic gum. The hydrolysis of the mixture of chlorosilanes, conversion of the hydrolysis product to the elastic gum stage, and compounding on differential rubber rolls and molding of the filled material were identical with the procedures employed in Example 1. All the molded sheets were cured for 18 hours at 150° C. before physical properties were determined.

Table 3

| Sample No. | Mol Per Cent Methyl Hydrogen Silicone | Cure Accelerator | Tensile Strength, p. s. i. | Per Cent Elongation at Break | Hardness | |
|---|---|---|---|---|---|---|
| | | | | | Scleriscope | Shore |
| A | 1.5 | Benzoyl Peroxide, 2.5 parts | 565 | 100 | 70 | 66 |
| B | 3.0 | do | 700 | 100 | 57 | 66 |
| C | 6.0 | | 180 | 100 | | 46 |
| D | 6.0 | Benzoyl peroxide, 1 part; Lead Monoxide, 1 part | 380 | 150 | | 60 |
| E | 6.0 | Benzoyl peroxide, 2 parts; Lead monoxide, 1 part | 460 | 100 | | 63 |
| F | 6.0 | Benzoyl peroxide, 2.5 parts | 650 | 100 | 57 | 72 |
| G | 12.5 | | 240 | 100 | 68 | 68 |
| H | 12.5 | Benzoyl peroxide, 2.5 parts | 760 | 100 | 55 | 78 |

To attain tensile strengths of substantially 400 p. s. i. of dimethyl silicone elastomers prepared according to the procedure disclosed in the previously mentioned Agens application, it would be necessary to heat-treat the molded product for at least 10 hours at 200° C.

It will be apparent to those skilled in the art that fillers other than those employed in the foregoing examples may be used. These include, e. g., ferric oxide, antimony oxide, asbestos in various forms, for example, asbestos floats, asbestos fibers, etc., comminuted glass fibers, whiting, lithopone, talc, zinc oxide, powdered silica, and the other finely divided solid materials used as fillers for natural and synthetic rubbers. Further information as to methods and procedures for hydrolyzing the chlorosilanes or mixtures of chlorosilanes, for converting the hydrolysis products to the elastic gum stage, and for compounding and molding the elastic filled or unfilled compositions may be found in the aforementioned Agens application.

The novel methyl- and hydrogen-substituted synthetic elastic polysiloxane compositions and synthetic elastomers prepared therefrom, as disclosed and claimed in our invention, are useful in applications where materials having rubber-like properties are required, such as gaskets, electrical insulation (for example, conductor insulation), shock absorbers, etc. Owing to their resistance to deterioration at high temperatures and their resistance to embrittlement at low temperatures, they are particularly useful in applications where natural rubbers or other synthetic rubbers fail, owing to the deleterious effect of heat or cold.

What we claim as new and desire to secure by Letters Patent of the United States is:

1. A solid, elastic, curable polysiloxane consisting of methyl radicals, and hydrogen, silicon, and oxygen atoms obtained by condensing a liquid consisting of polymeric dimethylsiloxane containing (a) up to 2 mol per cent copolymerized monomethylsiloxane and (b) from 1.5 to 50 mol per cent copolymerized methylhydrogensiloxane.

2. A heat-curable, synthetic, elastic product comprising a filler and containing as the elastic element thereof a solid, elastic, curable polysiloxane consisting of methyl radicals, and hydrogen, silicon and oxygen atoms obtained by condensing a liquid consisting of polymeric dimethylsiloxane containing (a) up to 2 mol per cent copolymerized monomethylsiloxane and (b) from 1.5 to 50 mol per cent copolymerized methylhydrogensiloxane.

3. A synthetic, elastic product comprising the cured composition of claim 2.

4. A new composition of matter comprising essentially the solid, elastic, heat-curable product of reaction of ingredients including (1) a liquid consisting of polymeric dimethylsiloxane containing (a) up to 2 mol per cent copolymerized monomethylsiloxane and (b) from 1.5 to 50 mol per cent copolymerized methylhydrogensiloxane and (2) a condensing agent for (1), the reaction between the condensing agent and the liquid polymer of (1) being allowed to take place for a time sufficient to yield the aforementioned solid, elastic product.

5. A new composition of matter comprising essentially the solid, elastic, heat-curable product of reaction of ingredients including (1) the liquid product of cohydrolysis of a mixture of ingredients consisting of dimethyldichlorosilane containing up to 2 mol per cent methyltrichlorosilane and from 1.5 to 50 mol per cent methyldichlorosilane and (2) a condensing agent for (1) the reaction between the condensing agent and the aforesaid liquid cohydrolysis product of (1) being allowed to take place for a time sufficient to yield the aforementioned solid, elastic product.

6. A new composition of matter as in claim 5 wherein the condensing agent is phenyl phosphoryl chloride.

7. A solid, elastic, heat-curable product obtained by treating with from 0.5 to 5 per cent, by weight, of a condensing agent, a liquid consisting of polymeric dimethylsiloxane containing (a) up to 2 mol per cent copolymerized monomethylsiloxane and (b) from 3 to 30 mol per cent copolymerized methylhydrogensiloxane, the reaction between the condensing agent and the aforesaid liquid being allowed to take place for a time sufficient to yield a solid, elastic product.

8. The process of making a new synthetic, solid, elastic, curable polysiloxane, which comprises treating, with a condensing agent, a liquid consisting of polymeric dimethylsiloxane containing (a) up to 2 mol per cent copolymerized monomethylsiloxane and (b) from 1.5 to 50 mol per cent methylhydrogensiloxane, the said liquid methyl- and hydrogen-substituted polysiloxane containing an average of from 1.98 to 2.0 total methyl groups and hydrogen atoms per silicon atom, the aforementioned liquid polymer being treated with the condensing agent for a time sufficient to yield a solid, elastic product.

9. The process as in claim 8 wherein the condensing agent is phenyl phosphoryl chloride.

10. The process of making a cured, synthetic, elastic composition which comprises (1) treating with a condensing agent a liquid consisting of polymeric dimethylsiloxane containing (a) up to 2 mol per cent copolymerized monomethylsiloxane and (b) from 1.5 to 50 mol per cent copolymerized methylhydrogensiloxane thereby to obtain a solid, elastic, curable polysiloxane, (2) compounding the said material with a filler, and (3) advancing the cure of the filled material under the influence of heat.

11. The process as in claim 10 wherein the solid, elastic, heat-curable material is compounded with a cure accelerator consisting of benzoyl peroxide and a filler comprising titanium dioxide.

12. The process of making a heat-curable, solid, elastic composition which comprises (1) hydrolyzing a mixture of halogenosilanes consisting of (a) from 50 to 97 mol per cent of dimethyldihalogenosilane, (b) from 0 to 2 mol per cent of a methyltrihalogenosilane, and (c) from 3 to 50 mol per cent of a methyldihalogenosilane, and (2) treating the resulting oily, isolated hydrolysis product with a condensing agent for a length of time sufficient to yield a solid, elastic, heat-curable product.

13. The process which comprises (1) hydrolyzing a mixture of chlorosilanes comprising (a) from 70 to 97 mol per cent dimethyldichlorosilane, (b) from 0 to 2 mol per cent methyltrichlorosilane, and (c) from 3 to 30 mol per cent methyldichlorosilane, (2) treating the isolated oily hydrolysis product with from 0.5 to 5 per cent, by weight, of phenyl phosphoryl chloride, and (3) allowing the contact between the phenyl phosphoryl chloride and the aforementioned oily hydrolysis product to take place at a temperature ranging from about 25° C. to 125° C. for a time sufficient to obtain a solid, elastic, curable polysiloxane.

MURRAY M. SPRUNG.
CHARLES A. BURKHARD.

REFERENCES CITED

The following references are of record in the file of this patent:

UNITED STATES PATENTS

| Number | Name | Date |
| --- | --- | --- |
| 2,377,689 | Hyde | June 5, 1946 |
| 2,392,713 | Wright et al. | Jan. 8, 1946 |

Certificate of Correction

Patent No. 2,448,556.  September 7, 1948.

MURRAY M. SPRUNG ET AL.

It is hereby certified that errors appear in the printed specification of the above numbered patent requiring correction as follows:

Column 2, line 4, for the patent number "2,346,220" read *2,436,220*; line 38, for that portion of the structural unit reading "—Si—C—" read —*Si—O*—;
and that the said Letters Patent should be read with these corrections therein that the same may conform to the record of the case in the Patent Office.

Signed and sealed this 1st day of March, A. D. 1949.

[SEAL]

THOMAS F. MURPHY,
*Assistant Commissioner of Patents.*